United States Patent Office 2,813,863
Patented Nov. 19, 1957

2,813,863

VAT DYESTUFFS OF THE PHTHALOYLCAR-
BAZOLE TRIAZINE SERIES

Asa W. Joyce, Plainfield, N. J., assignor to American
Cyanamid Company, New York, N. Y., a corporation
of Maine No Drawing. Original application December 17, 1953,
Serial No. 398,876, now Patent No. 2,729,638, dated
January 3, 1956. Divided and this application November 22, 1955, Serial No. 548,527

1 Claim. (Cl. 260—249)

This invention relates to a vat dyestuff having the following formula:

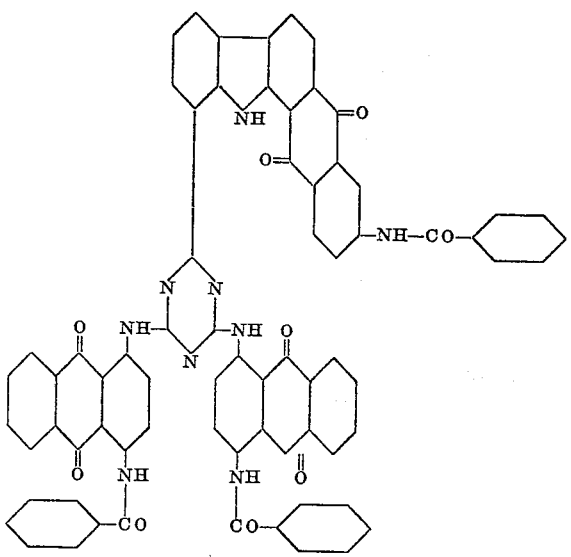

The invention will be described in greater detail in conjunction with the following specific examples in which the parts are by weight unless otherwise specified.

Ten and five-tenths parts of 2-(o-chlorophenyl)-4,6-di(4'-benzamido-1'-anthraquinonylamino)-1,3,5-triazine, 4.1 parts of 1-amino-5-benzamidoanthraquinone, 3 parts of sodium carbonate, 1.5 parts of anhydrous sodium acetate, and 0.3 part of cuprous bromide are added to 75 parts of molten naphthalene at about 100° C. The mixture is then stirred at 205° C.–210° C. until the reaction is substantially complete. The mass is cooled to about 150° C. and diluted with 150 parts of chlorobenzene. The mixture is filtered and the product is washed with chlorobenzene and acetone. Inorganic impurities are removed by hot extraction with dilute hydrochloric acid. The dyestuff, obtained in excellent yield, dissolves in concentrated sulfuric acid with a violet-red color and dyes cellulose fibers strong copper-brown shades of excellent fastness from a violet-brown vat.

Example 2

(See formula, columns 3 and 4)

Ten parts of anhydrous aluminum chloride and 40 parts of mononitrobenzene are fused at 60° C. Three and five-tenths parts of the product of Example 1 is added gradually and the mixture is stirred at 60°–65° C. until the reaction is substantially complete. The mixture is then drowned in an excess of dilute sodium hydroxide. The mononitrobenzene is removed by steaming, and the product is isolated by filtration and washing. An excellent yield is obtained of a product which dyes cellulose fabrics fast brown shades from a red vat.

A cellulose fabric is dyed from a vat containing caustic soda as its alkali and sodium hydrosulfite at about 50° C. After dyeing is complete, the fabric is removed, the leuco vat dyestuff oxidized by air, followed by washing and drying. The fabric is dyed a fast brown shade.

This application is a division of my copending application, Serial No. 398,876, filed December 17, 1953.

Example 1

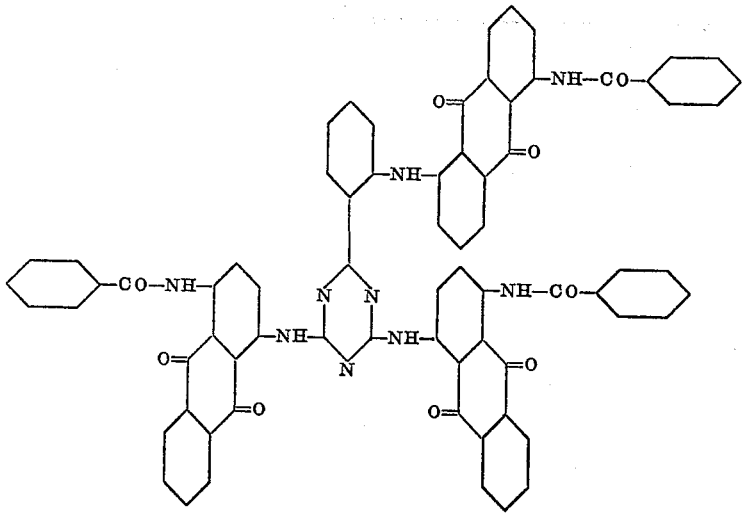

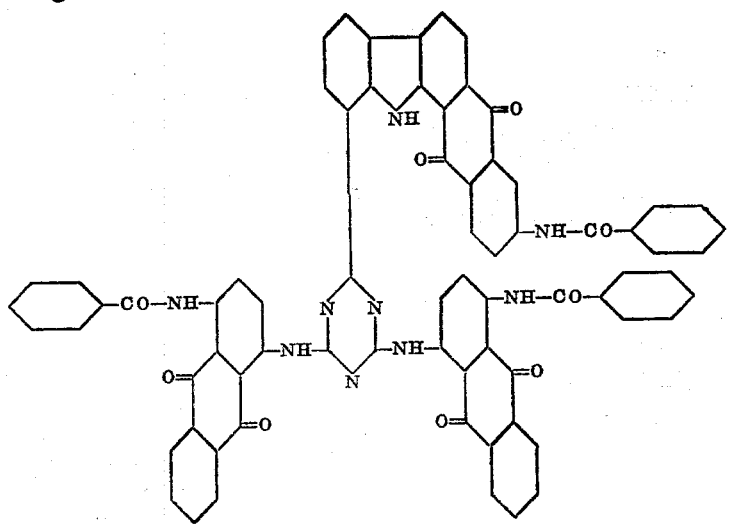
I claim:
A compound of the structure
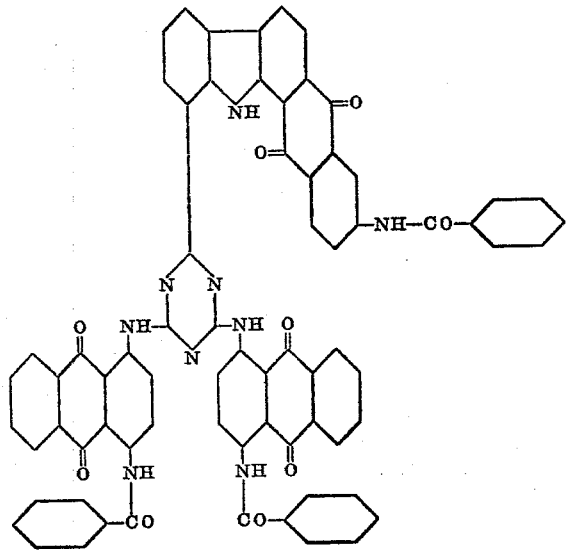
References Cited in the file of this patent
UNITED STATES PATENTS
2,729,638   Joyce _____ Jan. 3, 1956